United States Patent
Blackwell et al.

[15] 3,678,028
[45] July 18, 1972

[54] PREPARATION OF WATER-INSOLUBLE MONO-AND DIS-AZO DYES

[72] Inventors: John Blackwell, Kennett Square, Pa.; Alfred Tropea, Gibbstown, N.J.

[73] Assignee: E. I. du Pont de Nemours and Company, Wilmington, Del.

[22] Filed: June 1, 1970

[21] Appl. No.: 42,559

[52] U.S. Cl.....................260/186, 260/153, 260/160, 260/162, 260/187, 260/193, 260/207.1
[51] Int. Cl. .................................................C09b 31/04
[58] Field of Search.............260/144 P, 186, 192, 162, 163, 260/153, 176

[56] References Cited

UNITED STATES PATENTS 3,445,453  5/1969  Stocker..................................260/193

Primary Examiner—Joseph Rebold
Assistant Examiner—Donald M. Papuga
Attorney—Louis H. Rombach

[57] ABSTRACT

In an improved process for preparing water-insoluble azo dyes by diazotizing a first aromatic amine with sodium nitrite and coupling the diazonium salt thus produced to a second aromatic amine or active methylene coupling component, the improvement consisting of carrying out at least the diazotization reaction in a mixture of acetic acid and trichloroethylene and, optionally, a mineral acid, the weight ratio of acetic acid to trichloroethylene being within the range of 4:1 to 1:7.

8 Claims, No Drawings

PREPARATION OF WATER-INSOLUBLE MONO-AND DIS-AZO DYES

BACKGROUND OF THE INVENTION

1. Field of the Invention

This invention relates to the preparation of water-insoluble azo dyes, also referred to herein as disperse dyes.

2. Description of the Prior Art

The use of organic solvents in the preparation of water-insoluble azo dyes is well known and becomes necessary when a. an amine and its diazonium salt are insufficiently soluble in aqueous mineral acid to undergo diazotization by the conventional aqueous procedure with sodium nitrite and dilute mineral acid or b. when the coupling component is insufficiently soluble in aqueous mineral acid, if it is an amine, or in aqueous alkali, if it is phenolic or enolic in nature, to allow substantially quantitative coupling to occur.

Acetone, dioxane, ether and acetic acid have been used as reaction media using an alkyl nitrite as the diazotizing agent and benzene and chloroform have been used with dinitrogen trioxide as the diazotizing agent. "Methoden Der Organischen Chemie" (Houben-Weyl), Stickstoffverbindungen I, Teil 3, "-Methoden zur Herstellung und Umwandlung aromatischer Diazoniumsalze," Rolf Pütter, page 32.

U.S. Pat. No. 2,209,985 discloses a process for diazotizing aromatic amines with hydrochloric acid and sodium nitrite using dimethyl formamide as a solvent for the amine. Dimethyl formamide is toxic and high in cost; moreover, because of its high boiling point, 153°C., specific heat and latent heat of vaporization, it is difficult to recover by distillation of the waste liquors. Loss of dimethyl formamide in the waste liquors not only adds to the expense of its use but provides environmental pollution problems.

Acetic acid is a common solvent in which to effect the diazotization of aromatic amines. For example, British Pat. No. 852,396 discloses the diazotization of 2-chloro-4-nitroaniline in a cooled mixture of glacial acetic acid, concentrated hydrochloric acid and aqueous sodium nitrite, and Toji in U.S. Pat. No. 3,523,936, describes the diazotization of water-insoluble monoazo amines in aqueous acetic acid, hydrochloric acid and sodium nitrite.

Although the economics and recoverability of acetic acid are much superior to those of dimethyl formamide, its toxicity, corrosiveness and unpleasant odor may provide difficulties in its use.

Disazo disperse dyes are difficult to prepare directly in a high state of purity, being commonly contaminated with yellow to red monoazo impurities. Generally, small quantities of such impurities are tolerable and do not interfere with the properties of the disazo dye, particularly in the case of navy blue dyes which are often dyed in deep shades or are used as the basic component in black dye mixtures. However, for printing fabrics, particularly polyester-cotton blend fabrics, for example, by the method described by Blackwell et al. in Canadian Pat. No. 832,343, small amounts of monoazo impurities in navy blue dyes may have a deleterious effect on the definition of the print patterns produced therefrom. Furthermore, because of the lack of sublimation fastness of the monoazo impurities, a noticeable background stain may develop during the heating step of the printing operation. When such navy blue disazo dyes are prepared in an acetic acid medium and used in printing applications, it is necessary to recrystallize them before use.

SUMMARY OF THE INVENTION

It has been discovered that water-insoluble azo dyes can be prepared by an improved process which comprises reacting a diazotizable aromatic amine with sodium nitrite in a mixture of acetic acid and trichloroethylene and, optionally, a mineral acid, and then reacting the diazonium salt thus-formed with an aromatic amine or active methylene coupling component. The term "active methylene coupling component," as employed herein, refers to couplers having a methylene moiety whose hydrogen atoms are activated by one or two adjacent carbonyl groups. Examples of active methylene coupling components are pyrazolones, acylacetarylamides, barbituric acid and derivatives thereof.

DESCRIPTION OF THE INVENTION

The present invention comprises an improved process for preparing water-insoluble azo dyes by diazotizing a diazotizable first aromatic amine with sodium nitrite and then coupling the thus-formed diazonium salt with a second aromatic amine or active methylene coupling component, the improvement comprising carrying out at least the diazotization reaction in a mixture of acetic acid and trichloroethylene, the weight ratio of acetic acid to trichloroethylene being within the range of 4:1 to 1:7. Thus, the mixtures of acetic acid and trichloroethylene employed in the process of this invention consist of 20 to 87.5 weight percent trichloroethylene. Optionally, a mineral acid can be present along with the acetic acid and trichloroethylene. The preferred mineral acids are hydrochloric acid and sulfuric acid.

Disperse azo dyes can be prepared by the process of this invention either by adding the coupler to the diazo preparation or by dissolving or slurrying both the diazotizable aromatic amine and the coupler in acetic acid and trichloroethylene and, optionally, concentrated mineral acid, and then adding sodium nitrite either as an aqueous solution or as a solid. When all reactants are present simultaneously, coupling takes place immediately; in this way, the diazotization and coupling can be carried out in a one-step operation. Reaction temperatures for both the diazotization and the coupling reactions can range from about 0° to 30°C. If the desired reaction temperature is substantially below the freezing point of acetic acid, a portion of the acetic acid can be replaced with propionic acid to lower the freezing point. The optimum weight ratio of acetic acid to trichloroethylene depends on the dye being prepared. Ratios in the range of about 4:1 to 1:7 by weight generally are employed.

The process of this invention is most useful for the diazotization of monoazo amines and coupling of the diazo to the appropriate coupler to give disazo dyes, although it is also applicable to the preparation of monoazo dyes from aromatic amines that are of limited solubility in aqueous mineral acid.

The use of acetic acid in combination with trichloroethylene makes possible a reduction in the amount of acetic acid required. In some cases, the total amount of the solvent mixture is significantly less than the amount of acetic acid required if used alone as the reaction medium. Moreover, trichloroethylene is less toxic and less unpleasant to handle. The solvent system employed in this invention has another important advantage. Both organic components can be recovered readily in a high state of purity by fractionational distillation. The mother liquors from the process after removal of the dye contain trichloroethylene, acetic acid, water and dissolved solids. Trichloroethylene and water form an azeotropic mixture boiling at 73.6°C. and containing 5.4 percent by weight of water (C. Strumillo and S. Szapiro, *Przemysl. Chem.* 13, 442–444, 1957). On cooling, the azeotrope separates into two layers, allowing the water to be withdrawn practically free of organic solvent. The remaining trichloroethylene and acetic acid are separated by further fractionational distillation.

As indicated hereinabove, some prior art disazo dyes which are prepared in an acetic acid medium must be recrystallized before use to remove monoazo impurities, especially when the disazo dye is employed in printing operations. Certain disazo dyes prepared by the process of the present invention are of such purity that recrystallization is not necessary. Following is a description of a printing experiment utilizing such a disazo dye prepared by the process of this invention.

A 65/35 polyester-cotton blend fabric was padded to about 50–60 percent pickup with an aqueous solution containing 200 grams per liter of polyethylene glycol (M.W. 600).

The padded fabric was heated at 160°C. for 5 minutes to evaporate water and then was printed in a pattern with a print paste of the following composition:

| | |
|---|---|
| Navy blue dye past (15% active ingredient) prepared from the dye of Example 1 | 10 grams |
| "Polygum" 72 purified natural gum ether thickener | 60 grams |
| Water | 30 grams |

The printed fabric was heated at 200°C. for 100 seconds, scoured in water containing an ether-alcohol sulfate detergent at about 90°C. for 5 minutes, dried, scoured in tetrachloroethylene at about 50°C. for 5 minutes and dried. The printed areas were strongly dyed to a navy blue shade and had excellent clarity. No background staining was apparent.

A similar procedure was used to print a cotton fabric; the heating temperature was decreased to about 180°C. A comparable print was obtained.

The following examples are given to illustrate the process of this invention. All parts are by weight.

EXAMPLE 1

A mixture of 284 parts of acetic acid, 83 parts of trichloroethylene and 29.5 parts of 4-(p-nitrophenylazo)-1-naphthylamine was cooled externally to 5°C. and treated with 36.6 parts of aqueous 5N-sodium nitrite over a period of 20–30 minutes. The reaction mixture was stirred at 5°C. for 1 hour, after which 16.5 parts of N,N-diethyl-m-toluidine were added. The reaction mixture was stirred for 30 minutes. The solids were isolated by filtration, washed with acetic acid and then thoroughly with hot water, and finally were dried; yield, 38.0 parts. The dye had an absorptivity of 83.2 liters gram$^{-1}$ cm.$^{-1}$ at 595 m$\mu$. Thin layer chromatography using chloroform as eluent indicated only traces of two colored impurities in the navy blue dye. The dye had the structure

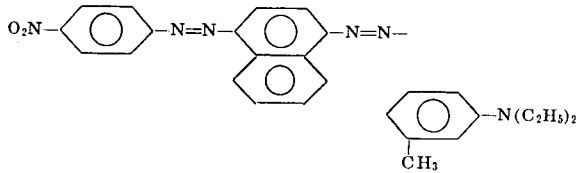

EXAMPLE 2

By using the procedure of Example 1, but substituting an equivalent amount of m-benzamido-N,N-dimethylaniline for N,N-diethyl-m-toluidine, a navy blue dye was obtained in a high state of purity; it exhibited an absorptivity of 93.0 liters gram$^{-1}$ cm.$^{-1}$ at 586 m$\mu$. The dye had the structure

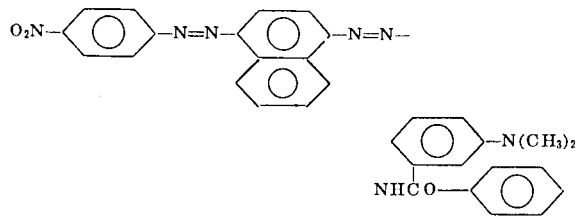

EXAMPLE 3

To a stirred mixture of 210 parts of acetic acid and 110 parts of trichloroethylene were added 11.3 parts of 4-(o-tolylazo)-2-toluidine and 22.3 parts of m-acetamido-N,N-bis(β-benzoyloxyethyl)aniline. After stirring the mixture for 10 minutes 10.02 parts of 40 percent sulfuric acid were added, followed by 15.9 parts of aqueous 5N-sodium nitrite in 37 parts of water, the latter added dropwise over a period of about 15 minutes at ambient temperature.

After stirring for 1-½ hours at room temperature, the product was isolated by filtration, washed with 25 parts of acetic acid and then with hot water until the filtrate was clear, and finally was dried. The yield of chromatographically pure red dye was 28.0 parts. The dye, m.p. 160°–163°C., had an absorptivity of 58.0 liters gram$^{-1}$ cm.$^{-1}$ at 505 m$\mu$. It had the structure

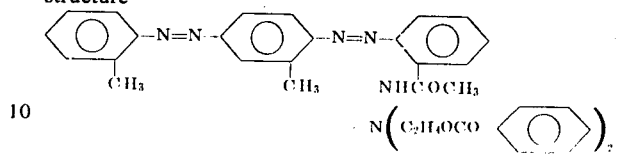

EXAMPLE 4

To a mixture of 325 parts of trichloroethylene, 22.7 parts of acetoacetyl-α-naphthamide, 66 parts of acetic acid and 17.2 parts of o-nitro-p-anisidine were added 29.5 parts of aqueous 5N-sodium nitrite at 25±2°C. over a period of 30–45 minutes. The resulting yellow precipitate was isolated by filtration, washed twice with 50 parts of acetic acid and then with warm water until the washings were neutral, and finally was dried. The yield of chromatographically pure yellow dye was 38.4 parts. The dye had an absorptivity of 45.2 liters gram$^{-1}$ cm.$^{-1}$ at 435 m$\mu$. The dye had the structure

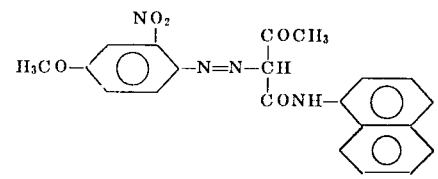

EXAMPLE 5

To a mixture of 210 parts of acetic acid, 110 parts of trichloroethylene, 7.8 parts of o-nitro-p-toluidine, 22.3 parts of m-acetamido-N,N-bis(β-benzoyloxyethyl)aniline and 9.5 parts of 10N-hydrochloric acid were added 15.9 parts of aqueous 5N-sodium nitrite in 37 parts of water over a 30-minute period at ambient temperature. The reaction mixture was stirred for 1-½ hours and the solids were isolated by filtration. The solids were washed with 26 parts of acetic acid and then with hot water until the washings were colorless, and finally were dried. The yield was 18.9 parts of chromatographically pure dye having an absorptivity of 51.0 liters gram$^{-1}$ cm.$^{-1}$ at 475 m$\mu$. The red dye had the structure

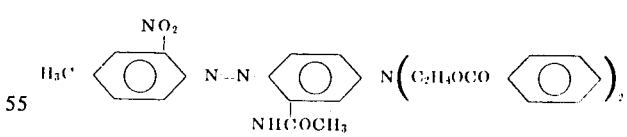

The embodiments of the invention in which an exclusive property or privilege is claimed are defined as follows:

1. In an improved two step process for preparing water insoluble monoazo and disazo dyes by diazotizing a first aromatic amine with sodium nitrite and coupling the resultant diazonium salt to a second aromatic amine or active methylene coupling component, the improvement consisting of carrying out at least the diazotization in a reaction medium of acetic acid and trichloroethylene, the weight ratio of acetic acid to trichloroethylene being within the range of 4:1 to 1:7.

2. The process of claim 1 wherein both the diazotization and the coupling are carried out in acetic acid/trichloroethylene.

3. The process of claim 1 wherein the reaction medium contains a mineral acid.

4. The process of claim 1 wherein the first aromatic amine is 4-(p-nitrophenylazo)-e1-naphthylamine and the coupling component is N,N-diethyl-m-toluidine.

5. The process of claim 1 wherein the first aromatic amine is 4-(p-nitrophenylazo)-e1-naphthylamine and the coupling component is m-benzamido-N,N-dimethylaniline.

6. The process of claim 1 wherein the first aromatic amine is 4-(o-tolylazo)-2c0-toluidine and the coupling component is m-acetamido-N,N-bis(β-benzoyloxyethyl)aniline.

7. The process of claim 1 wherein the first aromatic amine is o-nitro-p-anisidine and the coupling component is acetoacetyl-α-naphthamide.

8. The process of claim 1 wherein the first aromatic amine is o-nitro-p-toluidine and the coupling component is m-acetamido-N,N-bis(β-benzoyloxyethyl)aniline.

* * * * *